UNITED STATES PATENT OFFICE.

NIKODEM CARO, OF CHARLOTTENBURG, GERMANY, ASSIGNOR TO SOCIETÀ GENERALE PER LA CIANAMIDE, OF ROME, ITALY.

PROCESS OF MAKING INDIGO.

No. 860,900.

Specification of Letters Patent.

Patented July 23, 1907.

Application filed September 6, 1906. Serial No. 333,466.

*To all whom it may concern:*

Be it known that I, NIKODEM CARO, a subject of the Emperor of Germany, residing at Charlottenburg, near Berlin, Germany, have invented certain new and useful Improvements in a Process of Producing Indigo, of which the following is a specification.

My invention relates to the production of indigo synthetically, and is more especially concerned with the production of indigo from phenylglycin or its derivatives by the action upon it of a suitable alkali cyanamid.

The object of my invention is to increase the yield of indigo and I attain this object primarily by obviating the detrimental rise in temperature which is consequent to the heretofore practiced method.

It is already known, that in the action of a mixture of sodium amid and sodium cyanid upon phenylglycin, its alkali salts or other derivatives, such as phenylglycin-carbonic acid etc., reaction products, which give indigo by oxidation in the air, are produced.

Experiments have shown, that the formation of these products is due partly to the direct action of the sodium amid, but partly also to the action of the sodium cyanamid resulting from the sodium amid and the sodium cyanid. It has further appeared, that the action of such a mixture of sodium amid and sodium cyanid, partly because of the action of sodium cyanid upon sodium amid and partly because of the action of sodium amid upon the phenylglycin, is accomplished by such a great rise in temperature, that part of the product which gives indigo is thereby destroyed again.

I have discovered that a reaction which can be regulated in all phases may be obtained, however, by the use of the already prepared alkali cyanamid as condensation means, instead of its components the cyanid and amid. For example, I use disodium cyanamid as a condensation means instead of sodium cyanid and sodium amid. In such a process, however, it is necessary to mix the disodium cyanamid which melts at a high temperature, with a flux having a lower melting point, and which is, at the same time, inert to the phenylglycin or its derivative, in order to effect the reaction at a lower temperature and enable its regulation. An alkali cyanid, such as sodium cyanid, answers these requirements as a flux.

As an example of my invention, one part of disodium cyanamid with five parts of sodium cyanid may be heated up to the melting point in an iron crucible and phenylglycin or its sodium salt added. The formation of an indigo yielding substance then takes place without further heating, and the reaction proceeds almost quantitatively.

It is most suitable to proceed by putting equal parts by weight of the above described mixture of disodium cyanamid and sodium cyanid and phenylglycin or phenylsodium in a crucible heated up to 350–400° C., then leaching out the cooled fused mass and blowing a current of oxidizing gas, such as air, through the solution obtained.

Indigo is produced almost quantitatively in this way, and may be separated out and purified in the usual manner. Instead of using phenylglycin and phenylglycin sodium, one may employ to equal advantage phenylglycin-carbonic acid and its salts, and all such equivalents are intended to be covered by the term "phenylglycin", as used in the claims.

Since the dialkali cyanamid can be obtained directly from carbid in a simple manner, the process forming the subject of the present application provides a further important technical advantage with respect to the obtaining of this particular raw material.

Since in many cases derivatives of phenylglycin such as those mentioned in this specification can be employed as equivalents of phenylglycin, I shall refer in the claims to phenylglycin only, it being understood that its derivatives are considered by me as equivalents thereof.

Having thus described my invention, the following is what I claim as my invention, and desire to secure by Letters Patent:

1. The process of producing an indigo yielding substance, which consists in reacting upon phenylglycin, with an alkali cyanamid and a flux.

2. The process of producing an indigo yielding substance, which consists in reacting upon phenylglycin, with an alkali cyanamid and a flux inert to the phenylglycin.

3. The process of producing an indigo yielding substance, which consists in reacting upon phenylglycin, with an alkali cyanamid and a flux inert to the phenylgylcin and fusing at a lower temperature than the alkali cyanamid.

4. The process of producing an indigo yielding substance, which consists in reacting upon phenylglycin, with an alkali cyanamid and a flux consisting of an alkali cyanid.

5. The process of producing an indigo yielding substance, which consists in reacting upon phenylglycin with an alkali cyanamid and a flux consisting of sodium cyanid.

6. The process of producing an indigo yielding substance, which consists in reacting upon phenylglycin, with a cyanamid of sodium and a flux.

7. The process of producing an indigo yielding substance, which consists in reacting upon phenylglycin, with a cyanamid of sodium and a flux inert to the phenylglycin.

8. The process of producing an indigo yielding substance, which consists in reacting upon phenylglycin, with a cyanamid of sodium and a flux inert to the phenylglycin and having a melting temperature lower than the cyanamid.

9. The process of producing an indigo yielding substance, which consists in reacting upon phenylglycin, with a cyanamid of sodium and a flux consisting of an alkali cyanid.

10. The process of producing an indigo yielding substance, which consists in reacting upon phenylglycin, with a cyanamid of sodium and a flux consisting of sodium cyanid.

11. The process of producing an indigo yielding substance, which consists in reacting upon phenylglycin, with disodium cyanamid and a flux.

12. The process of producing an indigo yielding substance, which consists in reacting upon phenylglycin, with disodium cyanamid and a flux inert to the phenylglycin.

13. The process of producing an indigo yielding substance, which consists in reacting upon phenylglycin, with disodium cyanamid and a flux inert to the phenylglycin and having a lower melting temperature than the cyanamid.

14. The process of producing an indigo yielding substance, which consists in reacting upon phenylglycin with disodium cyanamid and a flux consisting of an alkali cyanid.

15. The process of producing an indigo yielding substance, which consists in reacting upon phenylglycin, with a dialkali cyanamid and a flux.

16. The process of producing an indigo yielding substance, which consists in reacting upon phenylglycin, with a dialkali cyanamid and a flux inert to the phenylglycin.

17. The process of producing an indigo yielding substance, which consists in reacting upon phenylglycin, with a dialkali cyanamid and a flux inert to the phenylglycin and having a lower melting temperature than the cyanamid.

18. The process of producing an indigo yielding substance, which consists in reacting upon phenylglycin, with a dialkali cyanamid and a flux consisting of an alkali cyanid.

19. The process of producing an indigo yielding substance, which consists in reacting upon phenylglycin, with a dialkali cyanamid and a flux consisting of sodium cyanid.

20. The hereindescribed process of producing indigo, which consists in heating a mixture of disodium cyanamid, sodium cyanid and phenylglycin up to between 350 and 400° C., cooling the fused mass, leaching the same to obtain a solution, and subsequently blowing an oxidizing gas through the solution.

21. The hereindescribed process of producing indigo, which consists in heating a mixture of disodium cyanamid and sodium cyanid with an equal amount by weight of phenylglycin, to a temperature of from 350° C. to 400° C., allowing the fused mass to cool, leaching the cooled mass to obtain a solution, and subsequently blowing an oxidizing gas through the solution.

NIKODEM CARO.

Witnesses:
WOLDEMAR HAUPT,
WILLIAM MAYNER.